(12) United States Patent
Allen et al.

(10) Patent No.: US 6,871,498 B1
(45) Date of Patent: Mar. 29, 2005

(54) COMPRESSOR SURGE PROTECTOR FOR ELECTRIC ASSISTED TURBOCHARGER

(75) Inventors: John F. Allen, El Segundo, CA (US); Rhett Hedrick, Santa Barbara, CA (US); Gerhard E. Delf, New Baltimore, MI (US); Daniel Black, Santa Barbara, CA (US); Kevin Birch, Santa Barbara, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/743,686

(22) Filed: Dec. 20, 2003

(51) Int. Cl.[7] .............................................. F02B 33/44
(52) U.S. Cl. ........................................................ 60/608
(58) Field of Search ......................... 60/608, 607, 605.3

(56) References Cited

U.S. PATENT DOCUMENTS

| | | | | |
|---|---|---|---|---|
| 5,560,208 A | * | 10/1996 | Halimi et al. | 60/608 |
| 6,079,211 A | * | 6/2000 | Woollenweber et al. | 60/608 |
| 6,415,606 B1 | * | 7/2002 | Bowman et al. | 60/608 |
| 6,553,764 B1 | * | 4/2003 | Gladden et al. | 60/608 |
| 6,609,375 B2 | * | 8/2003 | Allen et al. | 60/608 |
| 6,718,768 B2 | * | 4/2004 | Shaffer | 60/607 |
| 2004/0093867 A1 | * | 5/2004 | Masuda | 60/608 |

* cited by examiner

Primary Examiner—Thai-Ba Trieu
(74) Attorney, Agent, or Firm—Ephraim Starr; Chris James

(57) ABSTRACT

Systems for preventing/controlling compressor surge in an electrically assisted turbocharger comprise a turbocharger having an electric motor disposed around a turbocharger shaft. The electric motor controller is electrically coupled to the electric motor for controlling the rotational movement provided by the electric motor to the turbocharger shaft. A memory is electrically coupled to the electric motor controller and comprises a multi-dimensional map of compressor surge conditions stored therein. Sensors are used to provide desired engine and/or turbocharger operating information for comparing against the stored map data. The sensors are electrically coupled to the electric motor controller. The controller plots the actual operating information provided by the sensors on the stored map to evaluate whether the turbocharger is operating in different operating regions. If the plotted turbocharger operation falls within a surge risk or surge state operating region, the motor controller operates the electric motor in a manner that reduces the rotational speed of the turbocharger shaft.

4 Claims, 2 Drawing Sheets

COMPRESSOR SURGE PROTECTOR FOR ELECTRIC ASSISTED TURBOCHARGER

FIELD OF THE INVENTION

This invention relates generally to the field of turbochargers and, more particularly, to a system for protecting against compressor surge in electrically assisted turbochargers.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of that shaft. Thus, rotary action of the turbine also causes the air compressor to spin within a compressor housing of the turbocharger that is separate from the exhaust housing. The spinning action of the air compressor causes intake air to enter the compressor housing and be pressurized, or boosted, a desired amount before it is mixed with fuel and combusted within the engine combustion chamber.

Because the rotary action of the turbine is dependent upon the heat and volumetric flow of exhaust gas exiting the engine, turbochargers are often of reduced effectiveness when the engine to which they are coupled is run at a low speed.

The reduced effectiveness is often labeled turbo-lag. In order to overcome turbo-lag when the heat and volumetric flow of exhaust gas is low, an electric motor is known for rotating the shaft and inducing the compressor to spin.

Electrically assisted turbochargers are, however, especially susceptible to entering compressor surge regimes because such electric control of the compressor can enable the compressor to function in a manner that is relatively independent of engine operating conditions. Generally speaking, compressor surge is a turbocharger condition whereby pressurized air that is created by the compressor meets an internal system resistance, oftentimes causing the pressurized air to be forced backwards through the turbocharger. Surge can occur from different turbocharger operating conditions, and is known to occur during engine operating conditions of deceleration. Compressor surge is generally an undesirable condition that can cause several problems from noise to component failure, which can be detrimental to turbocharger life and performance. For these reasons, compressor surge is undesirable.

Therefore, it is desirable to provide a system for use with an electrically assisted turbocharger that enables control of the electric motor to protect the compressor against entering a compressor surge regime, thereby prolonging turbocharger service life and desired turbocharger performance.

SUMMARY OF THE INVENTION

A system for preventing/controlling compressor surge in an electrically assisted turbocharger, constructed according to principles of this invention, comprises a turbocharger having an electric motor disposed around a turbocharger shaft having attached thereto a compressor at one shaft end and a turbine at an opposite shaft end. The electric motor controller is electrically coupled to the electric motor for controlling the rotational movement provided by the electric motor to the turbocharger shaft.

A memory means is electrically coupled to the electric motor controller. The memory means has a multi-dimensional map of compressor surge conditions stored therein. In an example embodiment, the map provides certain regions of compressor operation based on different actual engine and/or turbocharger operating parameters to predicting compressor surge.

Sensors are used to provide desired engine and/or turbocharger operating information for comparing against the stored map data. The sensors are electrically coupled to the electric motor controller. The controller plots the actual operating information provided by the sensors on the stored map to evaluate whether the turbocharger is operating in different operating regions. In an example embodiment, the map is configured to provide three operating regions; namely, a normal operating region, a surge risk operating region, and a surge state operating region.

The electric motor controller is configured to control operation of the electric motor based where the turbocharger is operating according to the plot on the stored map. In the normal operating region, the motor controller allows the electric motor to operate normally. In the surge risk operating region, the motor controller reduces the current directed to the electric motor to slow turbocharger shaft rotation. In the surge state operating region, the motor controller reverses current polarity directed to the electric motor to impose an oppositely-directed torque onto the turbocharger shaft, thereby rapidly decreasing compressor rotational speed.

BRIEF DESCRIPTION OF THE DRAWINGS

The aspects of the present invention are more readily understood when considered in conjunction with the accompanying drawings and the following detailed description wherein.

DETAILED DESCRIPTION

In an embodiment of the present invention, a system for preventing an electric motor of an electrically assisted turbocharger from driving the compressor into a surge operation has a plurality of sensors electrically coupled to an electric motor controller. A multi-dimensional map that contains information about compressor surge states in relation to a plurality of sensed characteristics is programmed into the electric motor controller. The electric motor controller uses the multi-dimensional map to regulate the power that is delivered to the electric motor of the electrically assisted turbocharger once the electric motor controller receives information from the plurality of sensors that the system is approaching a surge state. If the sensors indicate that a surge state has been entered, the electric motor speed may either be reduced or may be operated as a speed brake (by applying a motor torque opposite to shaft rotation) in order to prevent compressor surging.

Figure 1:
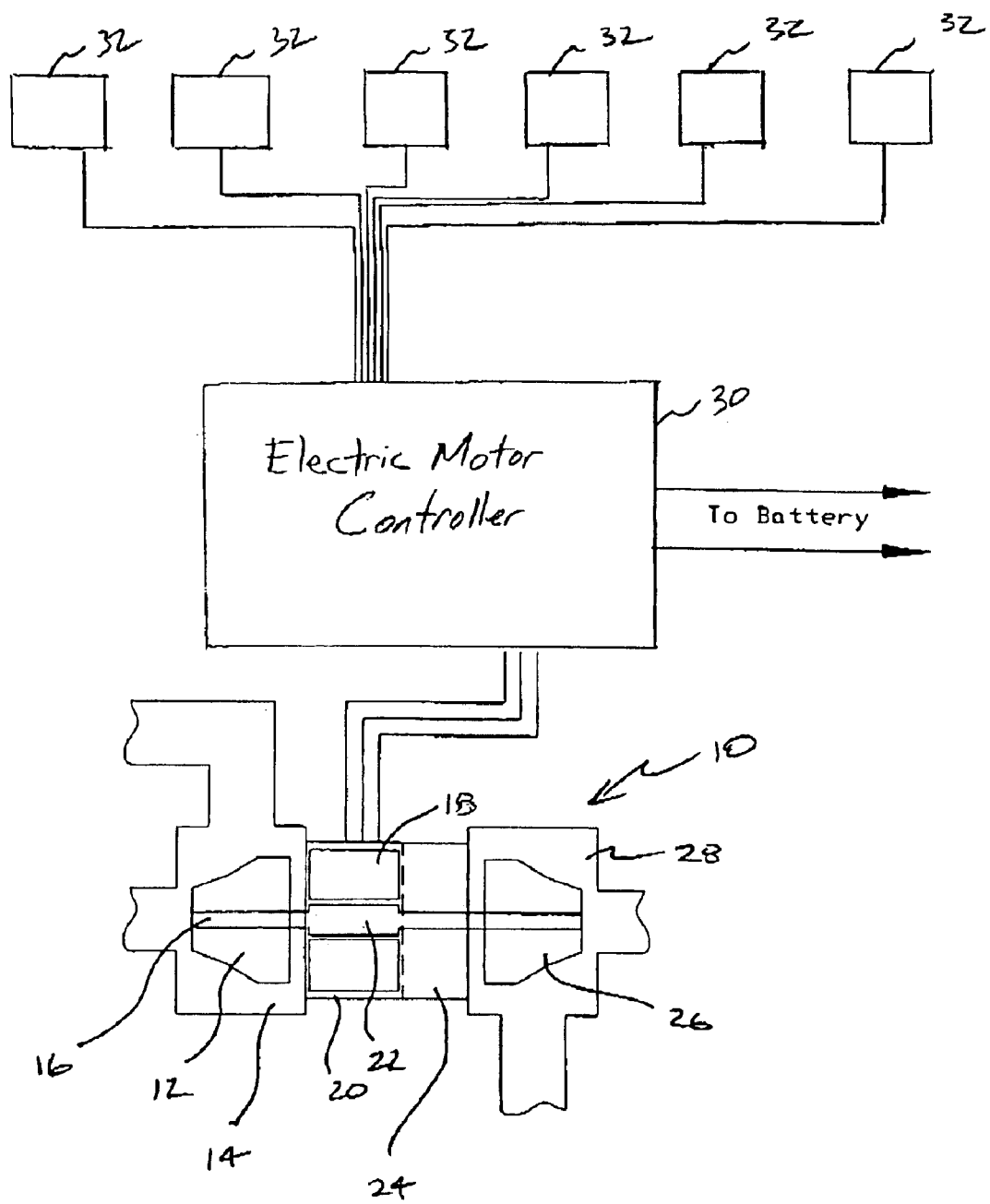
FIG. 1 is a schematic drawing illustrating a surge control/prevention system, as constructed according to the principles of this invention, as used in conjunction with an electrically assisted turbocharger.

FIG. 1 illustrates a surge control/prevention system of this invention comprising an electrically assisted turbocharger 10. The electrically assisted turbocharger 10 generally comprises (moving from left to right across FIG. 1) a compressor 12 that is disposed within a compressor housing 14, and that is attached to an end of a shaft 16. An electric motor 18 is disposed within a motor housing 20 that is attached to the compressor housing 14. The electric motor is disposed around a portion of the shaft 22 to effect rotational movement of the shaft by virtue of electric current being directed thereto.

The shaft 16 passes from the motor housing 20 into a center housing 24 that contains a bearing assembly (not shown) for carrying the shaft and for providing necessary lubrication thereto. Finally, a turbine 26 is attached to the remaining end of the shaft 16 and is disposed within a turbine housing 28. Configured in this manner, the electric motor can function to supplement the speed of the compressor if necessary to avoid unwanted turbocharger performance characteristics such as turbo lag when the engine is operating under conditions of low RPMs.

An electric motor controller is electrically coupled to the electric motor 18 for purposes of controlling the speed of the electric motor. The electric motor controller 30 can be configured to provide such control by regulating the amount of current directed to the electric motor and/or by changing the polarity of the current directed to the electric motor.

The electric motor controller 30 is electrically coupled to a plurality of sensors 32. The sensors 32 can be configured to monitor a number of different engine and/or turbocharger operating conditions/parameters. In an embodiment of the present invention, the sensors 32 are configured to sense at least two of the following performance parameters: (1) engine speed in revolutions per minute (RPM); (2) engine load; (3) intake air flow; (4) turbocharger operating pressures before and after the compressor; and (5) turbocharger speed in revolutions per minute (RPM).

The electric motor controller 30 is configured having the capability to store and read multi-dimensional maps that contain information about the surge states of a particular compressor in relation to a plurality of ascertainable engine and compressor characteristics. The electric motor controller 30 uses the multi-dimensional maps, in conjunction with the conditions sensed by the sensors 32 to limit (or even reverse) power to the turbocharger electric motor 18 when the compressor approaches a surge state.

Figure 2:
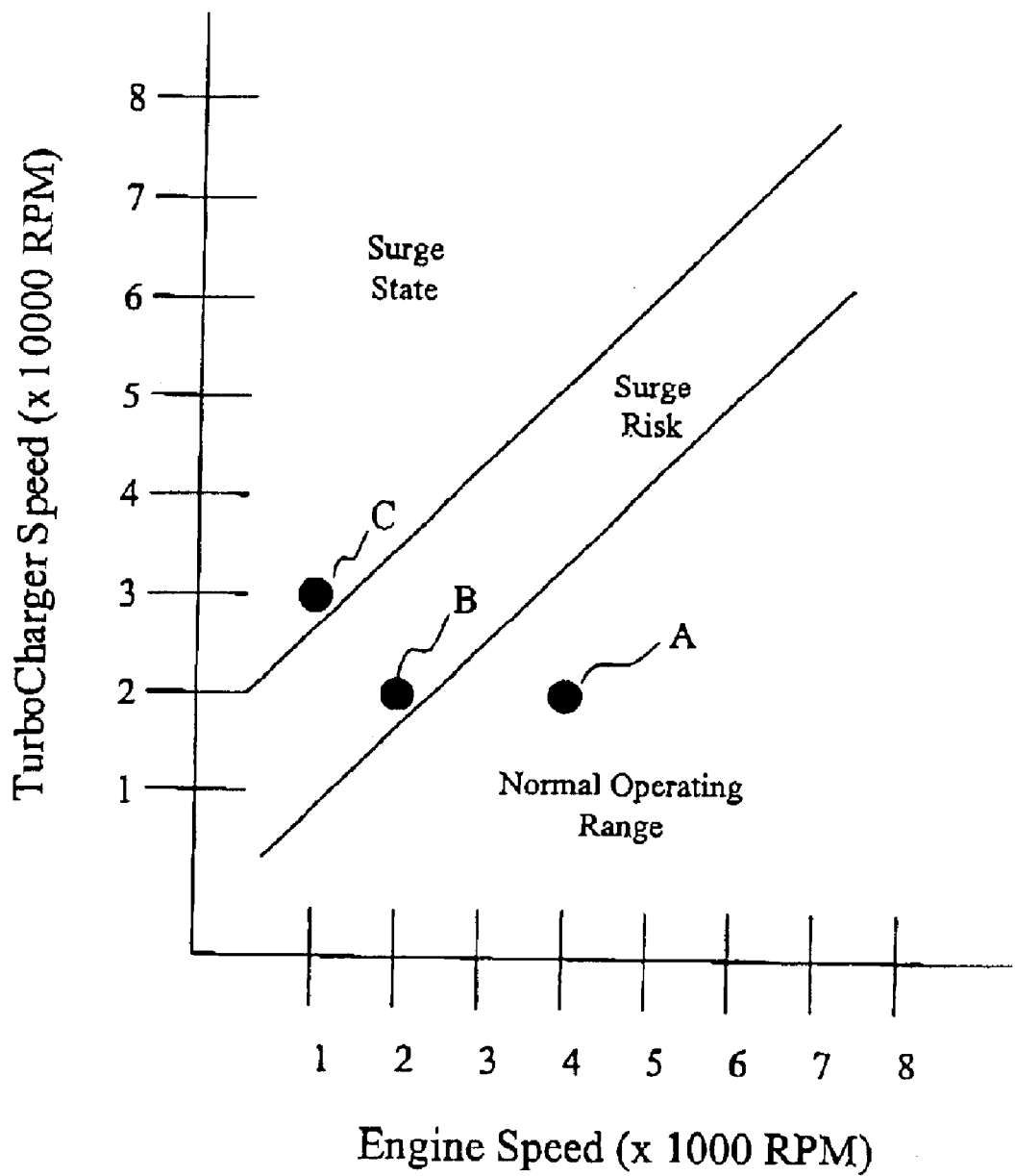
FIG. 2 is a graph that represents a multi-dimensional map of surge states as a function of engine speed (x-axis) and turbocharger speed (y-axis).

In one embodiment of the present invention, the surge prevention system comprises a sensor 32 that is configured to monitor engine speed, and a sensing means operable to monitor turbocharger speed. The turbocharger speed sensing means can include various types of devices or systems, including but not limited to a discrete speed sensor such as an encoder or the like. Alternatively, in the case where the electric motor is a sensorless motor having an associated control that is operable to determine motor speed by monitoring the rotating magnetic field in the stator, the sensorless motor provides the sensing means for monitoring turbocharger speed. A multi-dimensional map is created that correlates engine speed and turbocharger speed to surge conditions for the particular electrically assisted turbocharger being controlled, i.e., plotting possible surge regimes for the specific compressor design. Referring now to FIG. 2, such map is divided into three different regions; namely, a first region of normal operating range, second region of surge risk, and a third region of surge state. The multi-dimensional map of FIG. 2 represents the three such regions for a hypothetical turbocharger and engine system, and is provided for purposes of reference. It is to be understood that the three regions will occupy different locations on such plot depending on the particular application and turbocharger design characteristics.

The map is stored in a memory accessed by the electric motor controller. Because each engine and compressor have different surge states, a multi-dimensional map is created that contains information specific to a particular engine and compressor combination. Each time the engine speed and the turbocharger speed are communicated to the electric motor controller by the engine speed sensor and the turbocharger speed sensor, the electric motor controller plots the engine speed and the turbocharger speed on the stored multi-dimensional map.

If the plot taken from the provided sensor information indicates that the turbocharger is operating in a normal operating range, then power is provided by the motor controller to the turbocharger electric motor as normal. An example scenario where a turbocharger is operating in the normal range is where the engine is operating at a speed of approximately 4,000 revolutions per minute, and the turbocharger is operating at a speed of approximately 20,000 revolutions per minute. When plotted onto the map shown in FIG. 2, those operating conditions yield the location indicated at point A, which is in the normal operating range portion of the map.

However, if the plot taken from the sensor information indicates that there is a surge risk, then the input current to the electric motor is limited. An example scenario where there is a surge risk is where the engine is operating at a speed of 2,000 revolutions per minute and the turbocharger is operating at a speed of 20,000 revolutions per minute. When plotted onto the map shown in FIG. 2, such operating conditions yield the location indicated at point B, which is in a surge risk portion of the map. A plot in the surge warning portion of the map causes the controller to operate in a manner that reduces the power or current being directed to the electric motor, to thereby reduce turbocharger shaft speed.

If the plot taken from the sensor information indicates that a surge state has been entered, the motor controller operates the electric motor in a manner providing a rapid reduction in turbocharger speed. An example scenario where a surge state has been reached is where the engine is operating at a speed of approximately 1,000 revolutions per minute and the turbocharger is operating at a speed of 30,000 to revolutions per minute. When plotted onto the map shown in FIG. 2, such operating conditions yield the plot indicated at point C, which is in a surge portion of the map. A surge portion of the map causes the motor controller to reverse the polarity of power being directed to the electric motor, thereby imposing a torque in the opposite direction of the shaft movement to rapidly slow down the turbocharger and end the surge condition.

The map in FIG. 2 is illustrative of a two-dimensional map with three different compressor operating states. In additional embodiments of the present invention, the map is divided into more than three states, with each state having a different course of action. Additionally, the map can be based on more than two different engine and/or turbocharger performance parameters.

In an alternative embodiment of this invention, the sensor is one that is configured to monitor the air flow to the compressor. Additional sensors are provided for measuring the pressure ratio across the compressor. In this alternative embodiment, a multi-dimensional map is created that correlates air flow to the compressor and the pressure ratio across the compressor to surge conditions. The multi-dimensional map contains information specific to the particular compressor that is being used.

The surge information received from the sensors is stored as a function of intake air flow, and compressor pressure ratio in a multi-dimensional map. Each time the air flow and the compressor pressure ratio data are communicated to the electric motor controller, the electric motor controller plots the air flow and the compressor pressure ratio on the stored multi-dimensional map. As with the example embodiment provided above (for engine speed and turbocharger speed), if the plot indicates that the turbocharger is operating in a normal operating range, then power is provided to the electric motor as normal. However, if the plot indicates that there is a surge risk is approaching, then the input current to the electric motor is limited. If the plot indicates that a surge state has been entered, then the electric motor is controlled to provide a rapid reduction in turbocharger speed.

Having now described the invention in detail as required by the patent statutes, those skilled in the art will recognize modifications and substitutions to the specific embodiments disclosed herein. Such modifications are within the scope and intent of the present invention.

What is claimed is:

1. A method for controlling compressor surge in an electrically assisted turbocharger that is coupled to an internal combustion engine, the turbocharger including an electric motor disposed around a turbocharger shaft to provide rotational movement thereto, the method comprising the steps of:
    sensing a first parameter indicative of the rotational speed of the internal combustion engine;
    sensing a second parameter indicative of the rotational speed of the turbocharger shaft; and
    controlling the electric motor responsive to said first and second parameters so as to avoid surge based on a multi-dimensional map correlating compressor surge conditions to the speed of the internal combustion engine and to the speed of the turbocharger, wherein the step of controlling is performed by an electric motor controller that is coupled to the electric motor and that includes a memory connected thereto having the multi-dimensional map of surge conditions stored therein, and wherein the step of controlling comprises the electric motor controller reversing power to the electric motor in response detected surge conditions.

2. A system for controlling compressor surge in an electrically assisted turbocharger that is coupled to an internal combustion engine comprising:
    an electric motor disposed around a turbocharger shaft having attached thereto a compressor at one shaft end and a turbine at an opposite shaft end;
    an electric motor controller electrically coupled to the electric motor;
    a memory means electrically coupled to the electric motor controller, the memory means having a multi-dimensional map of compressor surge conditions stored therein; and
    at least two sensors electrically coupled to the electric motor controller, the sensors being configured to monitor operating conditions of at least one of the turbocharger and an internal combustion engine coupled thereto;
    the electric motor controller further configured to control operation of the electric motor responsive to signals provided from the sensors as correlated to the multi-dimensional map of surge conditions stored in the memory, wherein the electric motor controller is further configured to reverse power to the electric motor in response to signals from at least one of the engine speed sensor and turbocharger speed sensing means as correlated to the multi-dimensional map of surge conditions stored in the memory when a compressor surge condition is detected.

3. A system for controlling compressor surge in an electrically assisted turbocharger that is coupled to an internal combustion engine comprising:
    an electric motor disposed around a turbocharger shaft to provide rotational movement thereto;
    an electric motor controller electrically coupled to the electric motor for controlling the operation of the electric motor;
    an engine speed sensor electrically coupled to the electric motor controller for sensing the rotational speed of the internal combustion engine;
    a turbocharger speed sensing means coupled to the electric motor controller for sensing the rotational speed of the turbocharger shaft; and
    a memory electrically coupled to the electric motor controller, the memory having a multi-dimensional map stored therein of surge conditions correlating to the speed of the internal combustion engine and to the speed of the turbocharger;
    the electric motor controller further configured to control the electric motor responsive to the signals provided from the engine speed sensor and from the turbocharger speed sensing means as correlated to the multi-dimensional map of surge conditions stored in the memory, wherein the electric motor controller is further configured to reverse power to the electric motor in response to signals from at least one of the engine speed sensor and turbocharger speed sensing means as correlated to the multi-dimensional map of surge conditions stored in the memory when a compressor surge condition is detected.

4. A system for controlling compressor surge in an electrically assisted turbocharger that is coupled to an internal combustion engine comprising:
    an electric motor disposed around a turbocharger shaft to provide rotational movement thereto;
    an electric motor controller coupled to the electric motor for controlling rotational movement provided by the electric motor;
    an intake air sensor coupled to the electric motor controller for sensing a volume of air entering the turbocharger;
    a pressure ratio sensor coupled to the electric motor controller for sensing compressor pressure ratio; and
    a memory electrically connected to the electric motor controller, the memory having a multi-dimensional map stored therein of surge conditions correlating to the volume of air entering the turbocharger and the compressor pressure ratio;
    the electric motor controller further configured to control the electric motor responsive to the signals from the intake air sensor and from the pressure ratio sensor as correlated to the multi-dimensional map of surge conditions stored in the memory, wherein the electric motor controller is further configured to reverse power to the electric motor in response to signals from at least one of the air intake sensor and pressure ratio sensor as correlated to the multi-dimensional man of surge conditions stored the in the memory when a compressor surge condition is detected.

* * * * *